United States Patent [19]
Lee

[11] Patent Number: 6,053,271
[45] Date of Patent: Apr. 25, 2000

[54] DEVICE FOR OPENING SIDE WINDOW GLASS OF AUTOMOBILE SYNCHRONOUSLY WITH EXPANSION OF AIR BAGS

[75] Inventor: Joo-Young Lee, Kyunggi-do, Rep. of Korea

[73] Assignee: Hyundai Motor Company, Seoul, Rep. of Korea

[21] Appl. No.: 08/998,462

[22] Filed: Dec. 26, 1997

[30] Foreign Application Priority Data

Dec. 27, 1996 [KR]  Rep. of Korea ....................... 96-73881

[51] Int. Cl.$^7$ ........................... B60K 28/12; B60K 28/14; E05F 11/48
[52] U.S. Cl. ............................... 180/282; 49/352
[58] Field of Search .................... 180/271, 274, 180/281, 282; 280/739; 49/348, 352; 60/632

[56] References Cited

U.S. PATENT DOCUMENTS 4,494,336  1/1985  Ishii et al. ................................ 49/352
5,323,872  6/1994  Yabe ......................................... 180/271
5,823,608  10/1998  Tanaka et al. ......................... 296/146.2

FOREIGN PATENT DOCUMENTS 2242929A  10/1991  United Kingdom .

Primary Examiner—J. J. Swann
Assistant Examiner—Christopher Bottorff
Attorney, Agent, or Firm—Christie, Parker & Hale, LLP

[57] ABSTRACT

A device, for automatically opening a side window glass synchronously with an expansion of ESPS (electric single point sensing system) air bags, is disclosed. The device includes a window carrier movably engaging with a guide channel, and a regulator motor connected to the carrier by a cable. The device also includes a window glass module provided at the upper portion of the guide channel so as to be selectively operated by a self-diagnosis impact sensor of the air bags in the event of an expansion of the air bags, thus forcibly lowering said carrier along with the side window glass by means of the explosive power in such an expansion.

13 Claims, 4 Drawing Sheets

DEVICE FOR OPENING SIDE WINDOW GLASS OF AUTOMOBILE SYNCHRONOUSLY WITH EXPANSION OF AIR BAGS

BACKGROUND OF THE INVENTION

1. Field of the Invention

The present invention relates, in general, to a device for opening a side window glass synchronously with an expansion of air bags and, more particularly, to a device capable of automatically lowering the side window glass in the event of an expansion of the air bags, thus allowing excessively compressed air and explosive sound to be effectively discharged from the passenger compartment of an automobile into the atmosphere.

2. Description of the Prior Art

As well known to those skilled in the art, air bags are used as a passenger safety device for automotive vehicles. Such air bags have a bag, which is selectively and automatically inflated with pressurized gas so as to provide a cushioned protection against the impact of a collision. Such air bags are typically mounted in front of a driver's seat, front passenger's seat and/or rear seat providing a safety feature for the driver and passengers of an automobile.

However, an automobile with such conventional air bags has a problem as will be described below. That is, when the air bags are expanded in response to impact energy of a collision, the air in the passenger compartment or cabin of the automobile is instantaneously compressed. Also, due to the explosion of gunpowder embedded in the air bags, a high explosive sound is generated. Such compressed air and high explosive sound may easily inflict injury, such as an earblasting, on passengers.

Therefore, the passenger compartment of the automobile requires a quick opening in such a manner that the window glass of a side door is automatically lowered by a power window regulator.

In FIG. 1, an example of such a power window regulator is schematically illustrated. As shown in FIG. 1, a window glass 1 is movably held by a frame (not shown) of a side door, thus being upwardly and downwardly movable by means of the power window regulator.

In such a power regulator system, a window carrier 2 is mounted at the lower portion of the window glass 1, and is movably engaged with a vertical guide channel 3, which is interposed between inner and outer panels of the side door.

In addition, the carrier 2 is connected to a regulator motor 4 by a cable 5 so that the carrier 2 is upwardly or downwardly movable along the guide channel 3 according to a rotating direction of the regulator motor 4.

However, such a conventional power window regulator is designed to be operated without having any relation with the air bags. Therefore, when the air bags are quickly expanded in the passenger compartment with the side window glasses being fully closed, the explosive pressure of the air bags may be added to the impact pressure externally applied to the automobile, seriously inflicting injury on the passengers, especially the elderly or the weak. Thus, the safety and operational reliability of the automobile are reduced.

SUMMARY OF THE INVENTION

Accordingly, the present invention has been made in view of the above problems occurring in the prior art, and an objective of the present invention is to provide a device for opening a side window glass, which automatically lowers the side window glass in the event of an expansion of air bags, thereby allowing excessively compressed air and explosive sound to be effectively discharged from the passenger compartment into the atmosphere, reducing the injury of passengers.

In order to accomplish the above objective the present invention provides a device for automatically opening a side window glass synchronously with an expansion of ESPS (electric single point sensing system) air bags, having a window carrier fixedly mounted to the lower portion of the side window glass and movably engaging with a guide channel, and a regulator motor connected to the carrier by a cable, thus facilitating upwardly and downwardly sliding the carrier along said guide channel. Additionally a window glass module is provided at the upper portion of said guide channel so as to be selectively operated by a self-diagnosis impact sensor of the air bags in the event of an expansion of the air bags, thus forcibly lowering the carrier along with the side window glass by means of the explosive power in such an expansion.

The module includes: a holder fixed to the upper portion of the guide channel with gunpowder and an initial explosive, both being provided in the holder. An ignition member is buried in the initial explosive, the ignition member being selectively and electrically ignited by the impact sensor, thus generating the explosive power. A projectile member is detachably mounted to the lower portion of said holder, thus being selectively and explosively projected from the holder by the explosive power to move downwardly and forcibly push the carrier. Additionally, the module includes means for selectively coupling the projectile member to the carrier when the projectile member is projected, thus allowing the projectile member to continuously push the carrier.

BRIEF DESCRIPTION OF THE DRAWINGS

The above objectives, and other features and advantages of the present invention will be more clearly understood from the following detailed description taken in conjunction with the accompanying drawings, in which.

DESCRIPTION OF THE PREFERRED EMBODIMENT

Figure 1:
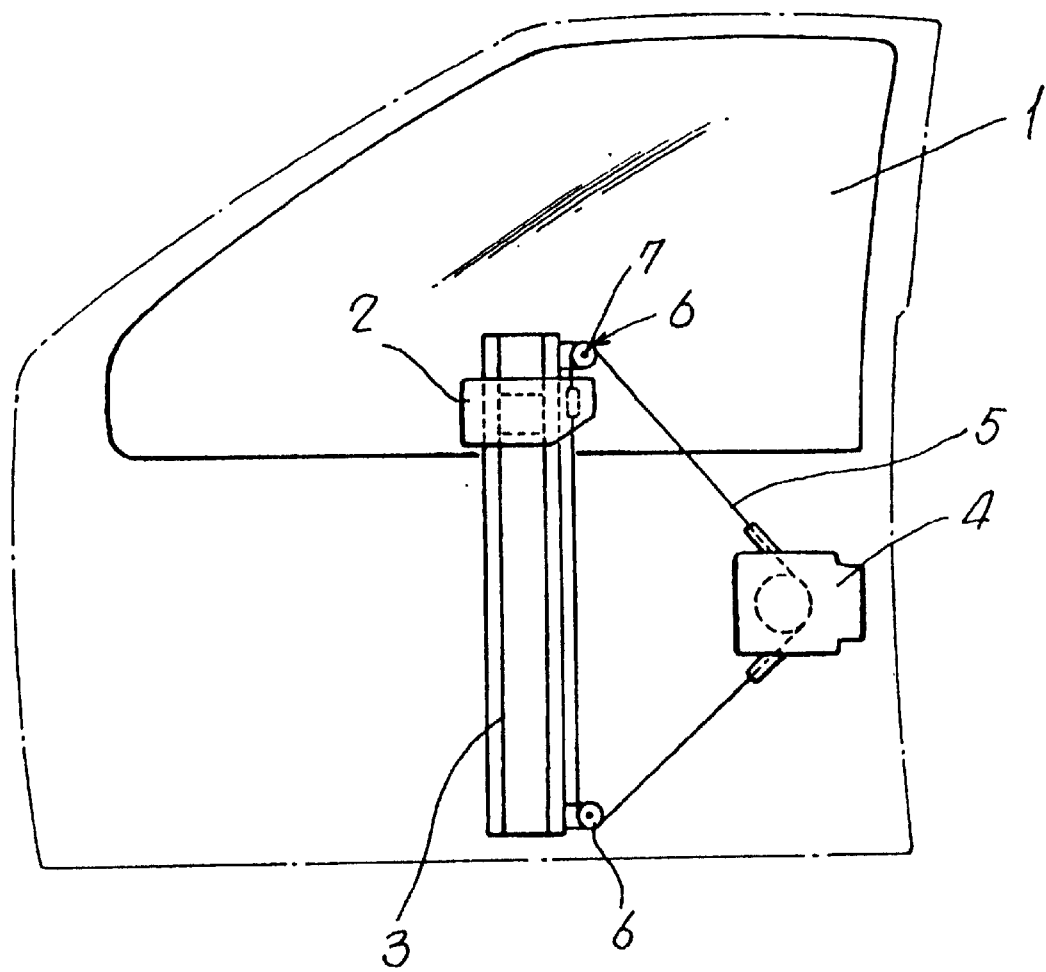
FIG. 1 is a schematic side view illustrating the construction of a power window regulator according to the prior art.
Figure 2:
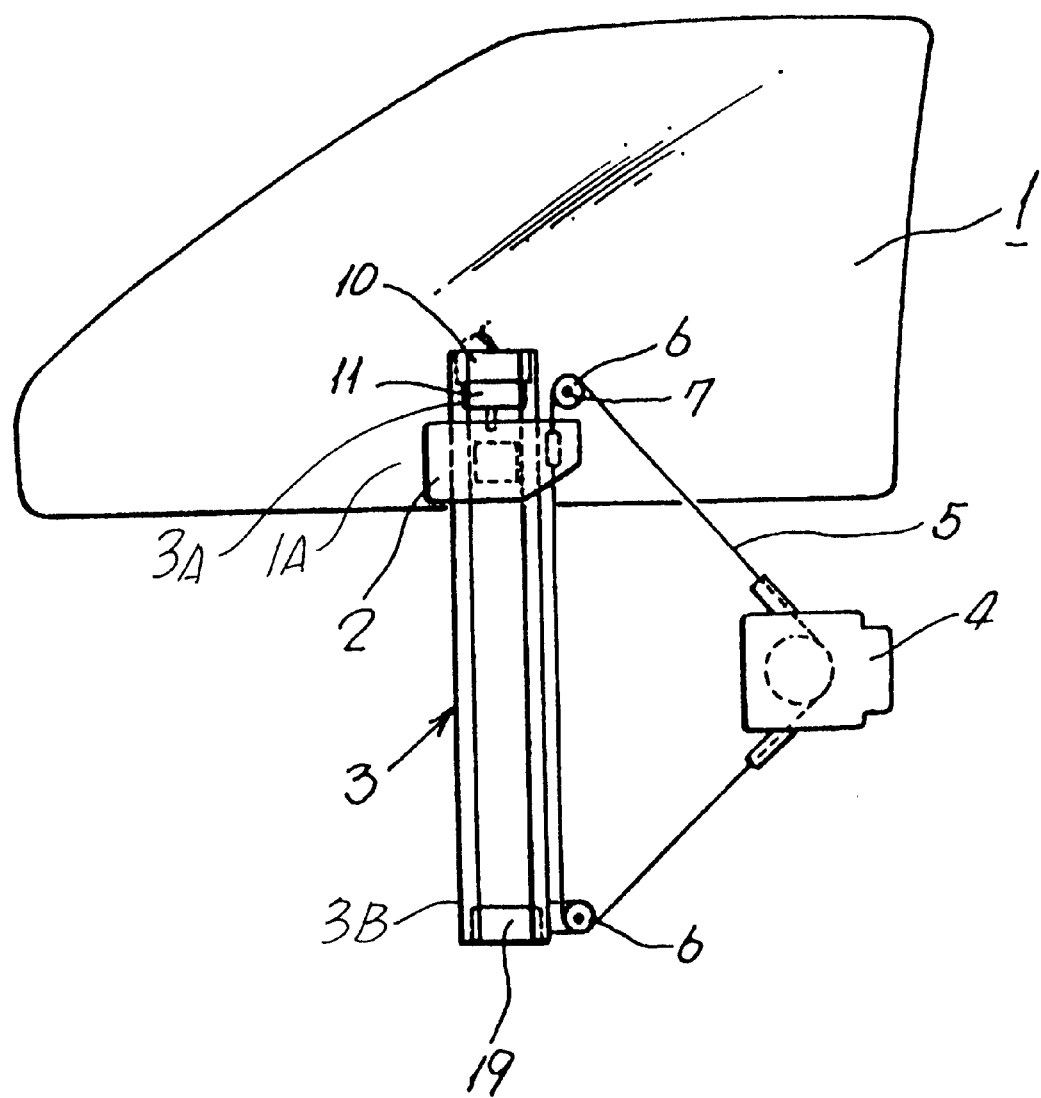
FIG. 2 is a schematic side view illustrating the construction of a power window regulator with the side window glass opening device in accordance with the preferred embodiment of this invention.
Figure 3:
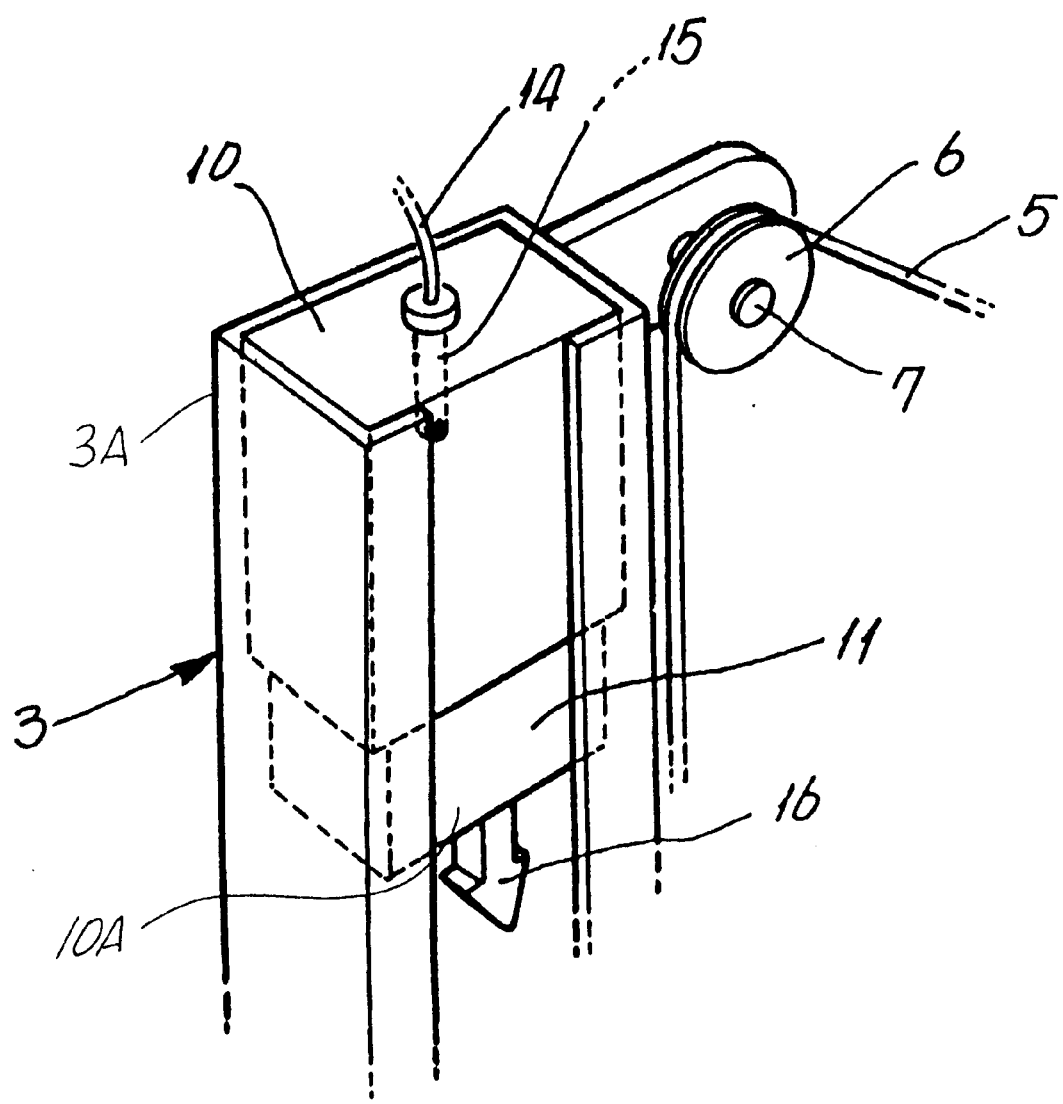
FIG. 3 is a partially exploded perspective view of the side window glass opening device according to this invention.
Figure 4:
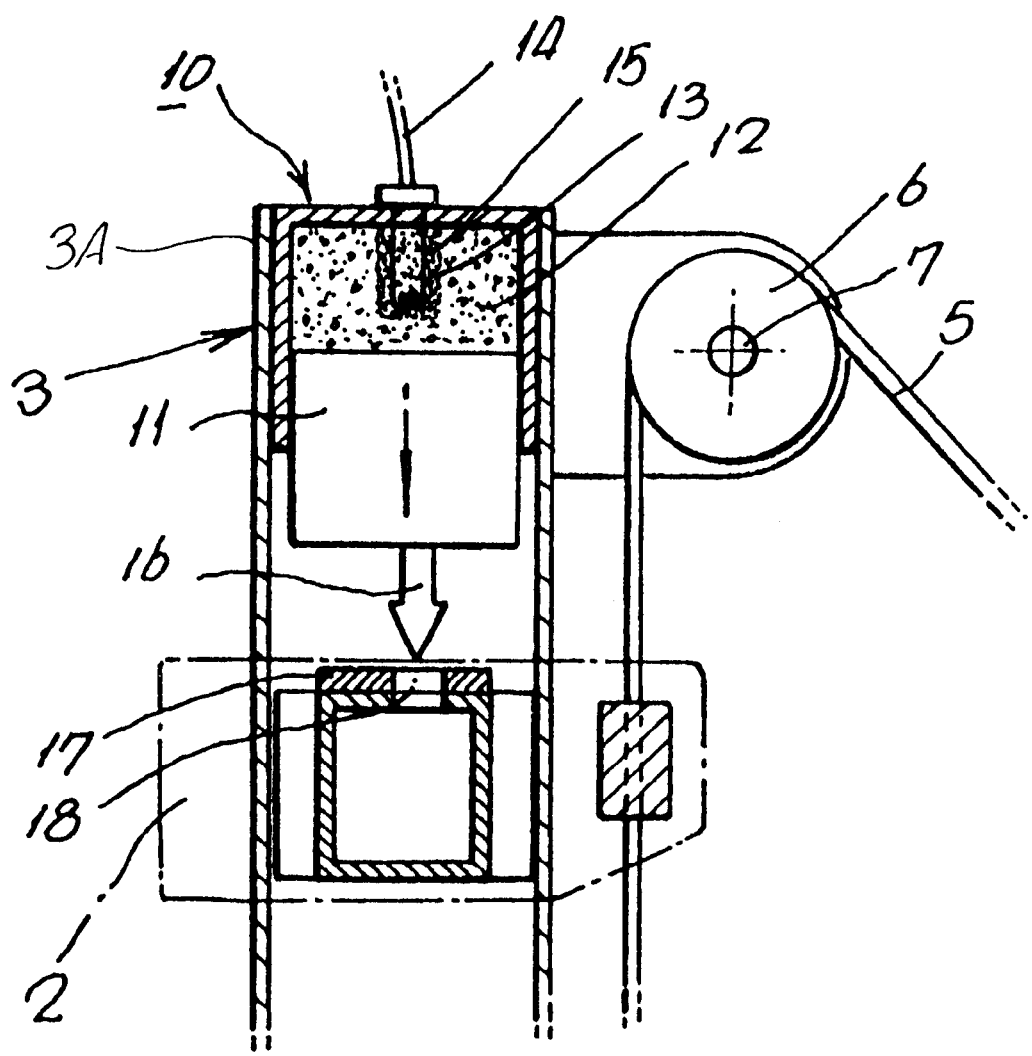
FIG. 4 is a schematically sectional view of the side window glass opening device in accordance with this invention.

FIG. 2 schematically shows the construction of a device for automatically opening a side window glass synchronously with an expansion of ESPS (electric single point sensing system) air bags according to the preferred embodiment of this invention.

As shown in FIG. 2, the device comprises a window carrier 2, which is fixedly mounted to a lower portion 1A of a side window glass, and is movably engaged with a vertical guide channel 3. In addition, the carrier 2 is connected to a regulator motor 4 by a cable 5, and is upwardly and downwardly slidable along the guide channel 3. That is, the carrier 2 is upwardly or downwardly movable along the guide channel 3 according to a rotating direction of the regulator motor 4. Thus, the side window glass 1 can be raised or lowered by a user.

In the present invention, the general construction and operation of the side window glass regulator remains the same as in the prior side window glass regulator and further explanation is thus not deemed necessary. However, the regulator of this invention is also provided with a device capable of allowing the side window glass to be automatically lowered in the event of an expansion of air bags.

That is, the device according to the present invention includes a window glass opening module provided at an upper portion 3A of the guide channel 3. The module is selectively operated by a self-diagnosis impact sensor of the air bags in the event of an expansion of the air bags.

Such a window glass module includes a holder 10 fixed to the upper portion of the guide channel 3. Gunpowder 12 and an initial explosive 13 are provided an contained within in the holder 10, while an ignition member 15 is buried in the initial explosive 13. The module also has a projectile member 11 which is detachably mounted to a lower portion 10A of the holder 10.

In the module, the ignition member 15 is designed to be selectively ignited by the impact sensor, thus generating the charge of the explosive power. The projectile member 11 is thus selectively and explosively projected from the holder 10 by the explosive power, moves downwardly, and forcibly pushes the carrier 2.

In addition, a breakable shaft 7, preferably made of a polyacetyl or other suitable material through a molding process, is fixedly mounted to the upper portion of the guide channel 3. A guide roller 6 is rotatably mounted to the guide channel 3 by the shaft 7, thus being selectively separable from the channel 3 along with the breakable shaft 7 when the tension force, acting on the cable 5 by the pushing force of the projectile member 11 applied to the cable 5 through the carrier 2, exceeds a predetermined reference force.

A damper 17 is mounted to the upper portion of the carrier 2 so as to damp and absorb the impact energy of the projectile member 11. A stopper 19 is fixedly mounted to the lower portion 3B of the guide channel 3 and is used for preventing a complete separation of the carrier 2 from the guide channel 3.

The window glass module further includes coupling means for selectively coupling the projectile member 11 to the carrier 2 when the projectile member 11 is projected, thus allowing the projectile member 11 to continuously push the carrier 2 without failure. The coupling means includes a locking hook 16 provided at the bottom of the projectile member 11, and a locking hole 18 provided at the top of the carrier 2 so as to allow the locking hook 16 to be snapped into the carrier 2 when the projectile member 11 is explosively projected.

The operation of the device for automatically opening the side window glass according to the preferred embodiment of this invention will be described below.

When an air bag is expanded due to a collision impact, which is applied to an automobile and is higher than a reference impact, the self-diagnosis impact sensor of the air bags is operated. Thus, the initial explosive 13 of the ignition member 15 is electrically ignited by means of an electric wire 14 through which current flows by the operation of the impact sensor. Thereafter, the projectile member 11 is downwardly projected along the guide channel 3 by the explosive power of the gunpowder 12.

Thereafter, the projectile member 11 forcibly comes into contact with the damper 17, and the locking hook 16 of the member 11 is inserted into the locking hole 18 of the carrier 2. Thus, the carrier 2 is downwardly and forcibly moved by the pushing force of the projectile member 11.

In such a case, the guide roller 6 is separated from the guide channel 3 along with the breakable shaft 7 because the tension force, acting on the cable 5 by the pushing force of the projectile member 11 applied to the cable 5 through the carrier 2, exceeds a predetermined reference force. Therefore, the carrier 2 is allowed to be downwardly moved.

When the shaft 7 is not broken in the event of an expansion of the air bags, the cable 5 may be unexpectedly cut, or both the carrier 2 and the guide channel 3 may be unexpectedly bent by the pushing force of the projectile member 11. However, in the device according to this invention, the shaft 7 is effectively broken by the pushing force of the projectile member 11, thus allowing the cable 5, carrier 2 and guide channel 3 to be free from being unexpectedly cut or bent and allowing the device of this invention to be reliably operated without failure.

Consequentially, the side window glass 1 is forcibly lowered by the carrier 2, thus allowing the excessively compressed air and the explosive sound to be effectively discharged from the passenger compartment into the atmosphere.

As mentioned above, the device for opening a side window glass in accordance with the present invention is provided with a window glass module capable of automatically lowering the side window glass in response to an operation of a self-diagnosis impact sensor of the air bags in the event of an expansion of the air bags, thus effectively preventing passengers from being injured by excessively compressed air or explosive sound. The device of this invention thus improves the safety and operational reliability of automobiles.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A device for automatically opening a side window glass synchronously with an expansion of electric single point sensing system air bags, the device comprising:

a guide channel having an upper portion;

a window carrier fixedly mounted to a lower portion of the side window glass and movably engaged with the guide channel;

a regulator motor connected to said carrier by a cable to facilitate upwardly and downwardly sliding of said carrier along said guide channel; and a window glass module provided at the upper portion of said guide channel so as to be selectively operated by a self-diagnosis impact sensor of the air bags in the event of an expansion of the air bags to forcibly lower said carrier, along with said side window glass wherein said module comprises:

a holder fixed to the upper portion of said guide channel;

gunpowder and an initial explosive, both being provided in said holder;

an ignition member buried in said initial explosive, said ignition member being selectively and electrically ignited by said impact sensor, thus generating explosive power;

a projectile member detachably mounted to a lower portion of said holder, thus being selectively and explosively projected from the holder by the explosive power to move downwardly and forcibly push said carrier; and means for selectively coupling the projectile member to said carrier when said projectile member is projected, thus allowing said projectile member to continuously push said carrier.

2. The device as claimed in claim 1 wherein said module comprises:

a breakable shaft fixedly mounted to the upper portion of said guide channel; and a guide roller rotatably mounted to said guide channel by the shaft so as to be selectively separated from said guide channel, along with the breakable shaft, when a tension force acting on the cable by the pushing of said projectile member and applied to the cable through said carrier, exceeds a predetermined reference force.

3. The device as claimed in claim 1 further comprising:

a damper mounted to the upper portion of said carrier so as to damp and absorb impact energy of said projectile member when it contacts the carrier.

4. The device as claimed in claim 1 wherein said coupling means comprises:

a locking hook provided at a bottom of said projectile member; and a locking hole provided at a top of said carrier so as to allow the locking hook to be snapped into said carrier when said projectile member is explosively projected.

5. The device as claimed in claim 1, further comprising;

a stopper mounted to a lower portion of said guide channel so as to prevent a complete separation of said carrier from said guide channel.

6. A apparatus for automatically opening a side window of a motor vehicle during expansion of an air bag in the vehicle, the apparatus comprising:

a guide channel having an upper portion;

a window carrier coupled to a lower portion of the window and slidably engaged with the guide channel; and a window opening module provided adjacent the upper portion of the guide channel, the module being automatically activated simultaneously with the expansion of the air bag comprising:

a holder fixedly coupled to the upper portion of the guide channel above the window carrier, an expansion assembly contained within the holder for generating explosive power; and a projection member detachably coupled to a lower portion of the holder, wherein the explosion assembly is automatically activated by expansion of the air bag, and wherein the explosive power generated by the explosion assembly projects the projection member toward the window carrier to force the carrier down the guide channel.

7. The apparatus according to claim 6 wherein the explosion assembly comprises:

gunpowder provided within the harder;

an initial explosive provided within the holder; and an ignition member provided within the initial explosive.

8. The apparatus according to claim 7 wherein the air bag comprises an impact sensor, and wherein the ignition member is electrically ignited by a signal from the impact sensor.

9. The apparatus according to claim 6 further comprising a damper mounted to the upper portion of the carrier.

10. The apparatus according to claim 6 further comprising a stopper mounted to a lower portion of the guide channel to prevent separation of the carrier from the guide channel.

11. The apparatus according to claim 6 wherein the module further comprises means for selectively coupling the projection member to the carrier when the projection member contacts the carrier.

12. The apparatus according to claim 11 wherein the coupling means comprises:

a hook provided at a bottom of the projection member; and a hole provided at a top of the carrier for engagement with the hook when the projection member contacts the carrier.

13. The apparatus according to claim 6 further comprising a regulator motor coupled to the carrier by a cable, and wherein the module further comprises:

a breakable shaft coupled to the upper portion of the guide channel; and a guide roller rotatably coupled to the guide channel by the shaft for guiding the cable, wherein the shaft is designed to break when tension in the cable exceeds a predetermined force level.

\* \* \* \* \*